United States Patent
Golecki

(10) Patent No.: US 7,700,167 B2
(45) Date of Patent: Apr. 20, 2010

(54) EROSION-PROTECTIVE COATINGS ON POLYMER-MATRIX COMPOSITES AND COMPONENTS INCORPORATING SUCH COATED COMPOSITES

(75) Inventor: Ilan Golecki, Parsippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 688 days.

(21) Appl. No.: 11/515,476

(22) Filed: Aug. 31, 2006

(65) Prior Publication Data

US 2008/0056905 A1 Mar. 6, 2008

(51) Int. Cl.
*C03C 17/00* (2006.01)
*C23C 16/00* (2006.01)
*C23C 14/32* (2006.01)
*C30B 23/00* (2006.01)

(52) U.S. Cl. .................. 427/596; 427/248.1; 204/192.1; 117/84; 416/241 R

(58) Field of Classification Search .................. None
See application file for complete search history.

(56) References Cited

U.S. PATENT DOCUMENTS

| | | | |
|---|---|---|---|
| 4,052,520 A | 10/1977 | Chang et al. | |
| 4,590,031 A | 5/1986 | Eichen et al. | |
| 4,741,975 A | 5/1988 | Naik et al. | |
| 4,815,940 A | 3/1989 | LeShane et al. | |
| 4,931,152 A | 6/1990 | Naik et al. | |
| 5,431,794 A | 7/1995 | Matsumaru et al. | |
| 5,547,767 A * | 8/1996 | Paidassi et al. | 428/610 |
| 5,702,829 A | 12/1997 | Paidassi et al. | |
| 5,873,699 A * | 2/1999 | Watson et al. | 415/200 |
| 5,935,360 A | 8/1999 | Griggs | |
| 6,382,920 B1 | 5/2002 | Dooper | |
| 6,436,739 B1 * | 8/2002 | Wickboldt et al. | 438/149 |
| 6,543,906 B2 | 4/2003 | Chou | |
| 6,752,911 B2 | 6/2004 | Jung | |
| 2001/0002000 A1 | 5/2001 | Kumar et al. | |
| 2001/0054856 A1 * | 12/2001 | Gabrys | 310/261 |
| 2004/0249043 A1 * | 12/2004 | Stoffer et al. | 524/430 |

(Continued)

FOREIGN PATENT DOCUMENTS

EP 0366289 A1 5/1990

(Continued)

OTHER PUBLICATIONS

Mostafa, English translation of FR2691170, Nov. 1993.*

(Continued)

*Primary Examiner*—Timothy H Meeks
*Assistant Examiner*—Joseph Miller, Jr.
(74) *Attorney, Agent, or Firm*—Ingrassia Fisher & Lorenz, P.C.

(57) ABSTRACT

A stator vane is provided that includes an airfoil and a coating. The airfoil comprises a polymer matrix fiber composite having a melting point, glass transition temperature, or maximum exposure temperature that is less than about 150° C. The coating is formed over the airfoil and comprises a material that is more erosion-resistant than the polymer matrix fiber composite, where the material is the selected from a group of constituents consisting of titanium, chromium, vanadium, and zirconium, and nitrides, carbides, mixed carbonitrides, oxides, oxynitrides, oxycarbides, and oxycarbonitrides thereof. Methods for making the stator vane are provided as well.

18 Claims, 2 Drawing Sheets

U.S. PATENT DOCUMENTS

2007/0098889 A1 * 5/2007 Nose et al. ............... 427/248.1

FOREIGN PATENT DOCUMENTS

| EP | 0615966 | A1 | 9/1994 |
| FR | 2691170 | A3 | 11/1993 |
| GB | 1206771 | | 9/1970 |
| JP | 60067654 | A | 4/1985 |
| JP | 5065637 | A | 3/1993 |
| WO | 9324243 | | 12/1993 |
| WO | WO/2005/024090 | * | 3/2005 |

OTHER PUBLICATIONS

EP Search Report, 07253441.5, dated Jan. 14, 2008.

* cited by examiner

EROSION-PROTECTIVE COATINGS ON POLYMER-MATRIX COMPOSITES AND COMPONENTS INCORPORATING SUCH COATED COMPOSITES

TECHNICAL FIELD

The present invention relates to stator vanes and, more particularly, to coatings for stator vanes.

BACKGROUND

Turbine engines are used as the primary power source for various kinds of aircraft. The engines may also be used as auxiliary power sources to drive air compressors, hydraulic pumps, and for industrial gas turbine (IGT) power generation. Further, the power from turbine engines is used for stationary power supplies such as backup electrical generators for hospitals and the like.

Most turbine engines generally follow the same basic power generation procedure. Air is ingested into a fan section, and directed into a compressor section to be compressed. The compressed air is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more air into the engine and the high velocity combustion gas is passed out of the gas turbine aft end to create forward thrust.

To draw air into the engine fan section in a desired manner, stator vanes are typically disposed therein. When the air passes over the stator vanes, sand, dust, and other air-borne particulate that may be present therein, may impinge the vanes. Over an extended period of time, the vanes may become eroded, which may lead to a decreased life cycle of the turbine engine (i.e., their premature removal). To minimize erosion, the stator vanes are typically coated with an erosion-protective coating.

Because lighter components generally allow for increased engine efficiency, aircraft components are preferably made of lightweight materials. However, manufacturing lightweight, erosion-resistant stator vanes has presented certain challenges. For example, lightweight polymer matrix fiber composites, useful for making uncoated stator vanes, generally have melting points, glass transition temperatures, or maximum exposure temperatures that are significantly lower than that of the erosion-protective coating material (e.g. below 150° C.). Consequently, conventionally used deposition processes, which are typically performed at temperatures above 200° C., and often at temperatures above 500° C., have not been useful. Moreover, the conventionally used deposition processes do not produce coatings that suitably adhere to and protect the stator vanes.

Accordingly, there is a need for a coating process that produces suitable erosion-protective coatings on aircraft components. Moreover, it is desirable for the coating process to be relatively inexpensive and simple to perform. Additionally, it is desirable for the coating process to be easily implemented into existing component manufacturing processes.

BRIEF SUMMARY

The present invention provides a stator vane that includes an airfoil and a coating. The airfoil comprises a polymer matrix fiber composite having a melting point, glass transition temperature, or maximum exposure temperature that is less than about 150° C. The coating is formed over the airfoil and comprises a material that is more erosion-resistant than the polymer matrix fiber composite, where the material is selected from a group of constituents consisting of titanium, chromium, vanadium, and zirconium, and nitrides, carbides, mixed carbonitrides, oxides, oxynitrides, oxycarbides, and oxycarbonitrides thereof.

Methods for making the stator vane are provided as well. In one embodiment, and by way of example only, the method includes maintaining the stator vane at a temperature substantially equal to or below a predetermined temperature, the stator vane comprising a polymer matrix fiber composite having a melting point, glass transition temperature, or maximum exposure temperature that is less than about 150° C., and the predetermined temperature being less than the melting point, glass transition temperature, or maximum exposure temperature and forming a coating over the stator vane, while the stator vane temperature is maintained substantially equal to or below the predetermined temperature, the coating comprising a material that is more erosion-resistant than the polymer matrix fiber composite.

In another embodiment, by way of example only, the method includes maintaining the stator vane at a temperature substantially equal to or below a predetermined temperature, the stator vane comprising a polymer matrix fiber composite having a melting point, glass transition temperature, or maximum exposure temperature that is less than about 150° C., and the predetermined temperature being less than the melting point, glass transition temperature, or maximum exposure temperature. Next, a coating is formed over the stator vane, while the stator vane temperature is maintained substantially equal to or below the predetermined temperature, the coating comprising a material that is more erosion-resistant than the polymer matrix fiber composite. Then, a layer is formed over the coating, while the stator vane temperature is maintained substantially equal to or below the predetermined temperature, the layer comprising a material that is more erosion-resistant than the coating. A nanolaminate is formed by repeating the steps of forming a coating and forming a layer over the coating.

Other independent features and advantages of the preferred method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
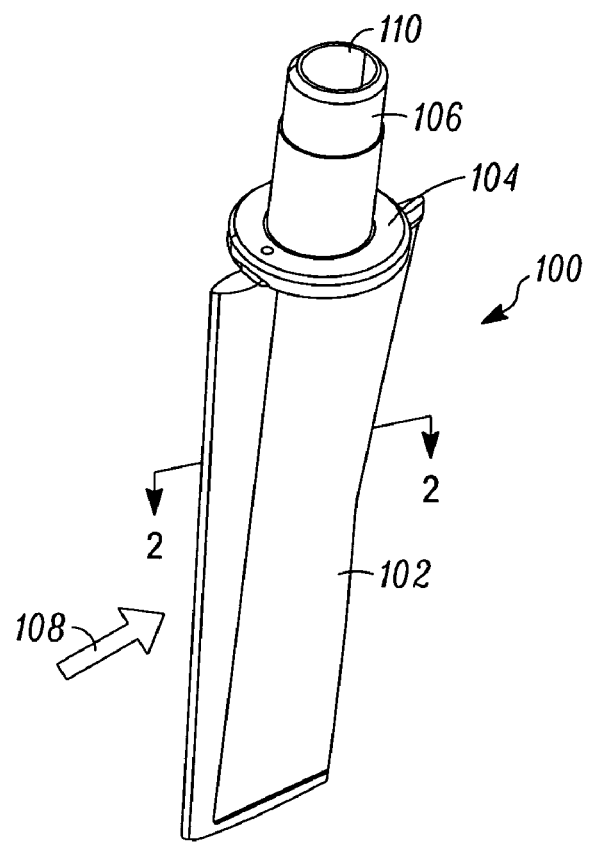
FIG. 1 is a perspective view of an exemplary stator vane.

Turning now to FIG. 1, an exemplary stator vane 100 is depicted. The stator vane 100 includes an airfoil 102, a platform 104, and a stem 106. The platform 104 is configured to radially contain airflow and to position the vane 100 in a primary flow path 108. The stem 106 attaches the vane 100 to an annular casing (not shown) and includes one or more apertures 110 formed therein that communicate with an annular casing manifold (not shown). Although the stem 106 is shown with a cylindrical configuration, it will be appreciated that in other embodiments, any one of numerous other shapes suitable for attaching the vane 100 to the annular casing may alternatively be employed.

Figure 2:
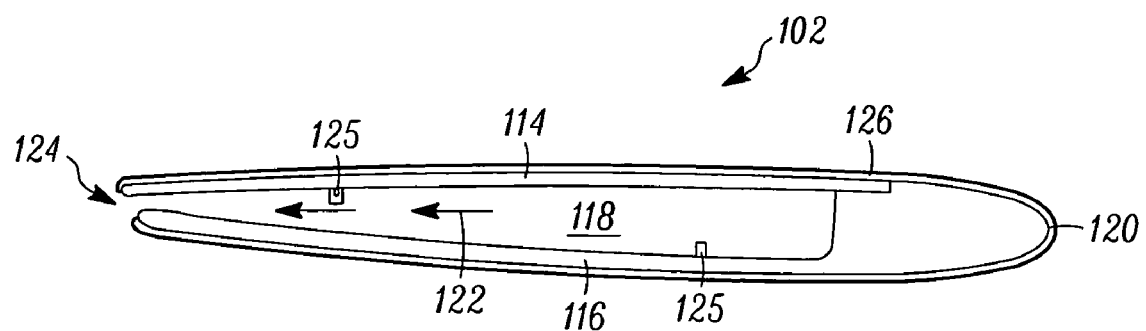
FIG. 2 is a cross section view of the stator vane taken along line 2-2.

Referring now to FIG. 2, a cross section view of the airfoil 102 is provided. The airfoil 102 has two walls 114, 116, a leading edge 120, and a trailing edge section 124. The walls 114, 116 are spaced apart from one another to define a plenum 118 therebetween and are joined together at the leading edge 120. The plenum 118 is configured to direct a secondary airflow 122 therethrough that is received from the stem aperture 110. In some embodiments, standoffs 125 may be disposed in the plenum 118 to direct the secondary airflow 122 in a desired direction.

To reduce aircraft weight and improve engine efficiency, the airfoil 102 is preferably made of a polymer matrix fiber composite (also referred to in the art as a polymer matrix composite) and is coated with an erosion-protective coating 126. The polymer matrix fiber composite may be any of numerous suitable composites, such as carbon fiber epoxy matrix, carbon fiber bismaleimide matrix, and the like. The erosion-protective coating 126 is preferably a hard, inorganic material that is more erosion-resistant than the polymer matrix fiber composite. Suitable materials include, but are not limited to, at least one material selected from a group of constituents consisting of titanium, chromium, vanadium, and zirconium, and nitrides, carbides, mixed carbonitrides, oxides, oxynitrides, oxycarbides, and oxycarbonitrides thereof.

Although the erosion-protective coating 126 is shown as a single layer, it will be appreciated that, in some cases, it may be more advantageous to form the coating 126 as a multi-layered coating. In still other cases, it may be more advantageous to form the coating 126 as a nanolaminate coating. In either case, the coating 126 may have layers that alternate in composition. For example, the coating 126 may include alternating layers of a material having a first hardness, each interposed with a layer of material that has a second hardness that is harder than the first hardness. In one exemplary embodiment, Ti layers may each be interposed with a layer of TiN. The composition of the alternating layers may also change gradually, rather than abruptly at the interfaces.

Figure 3:
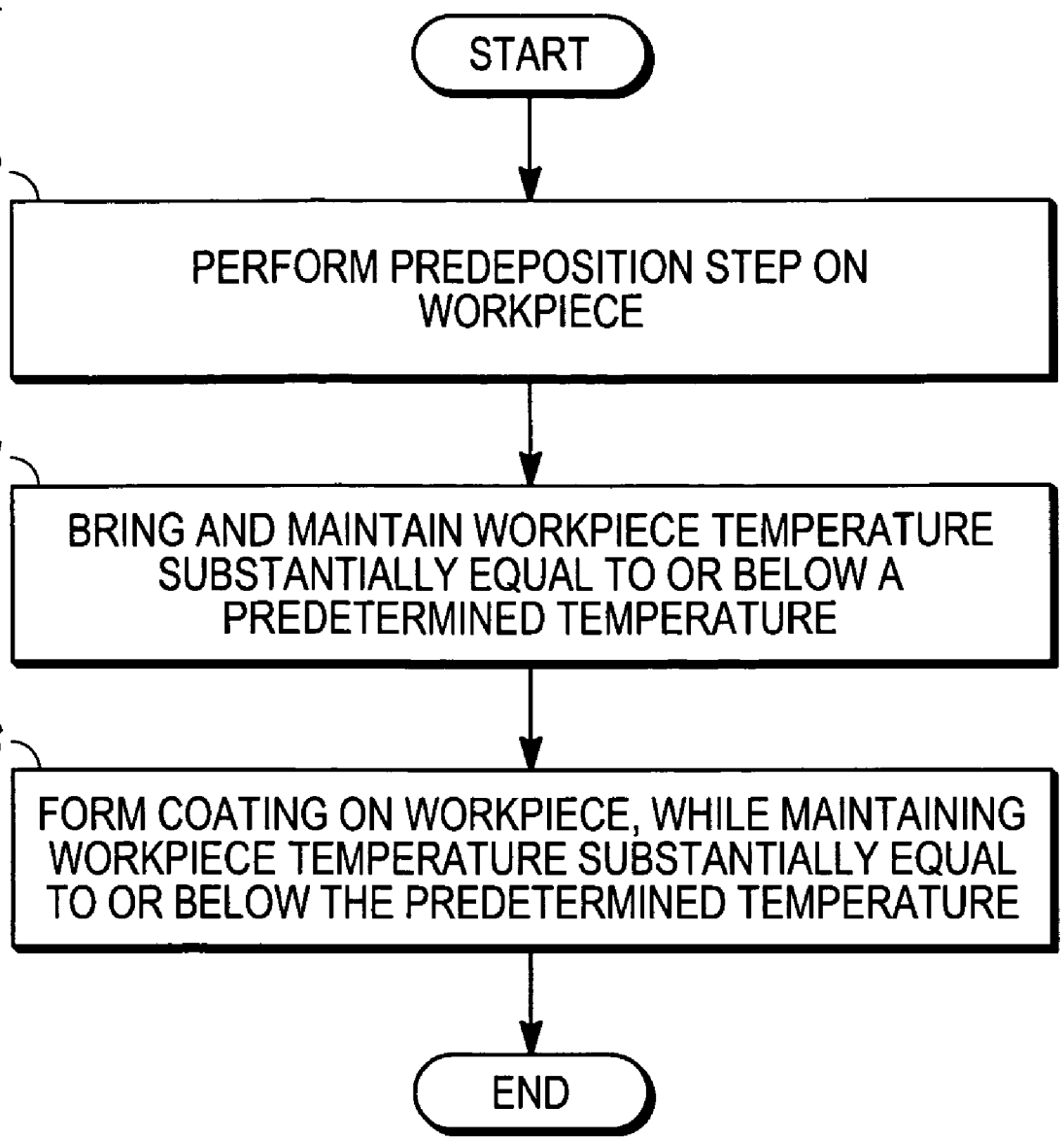
FIG. 3 is a flow diagram of an exemplary method of forming a coating on the stator vane.

Generally, the polymer matrix fiber composites referred to above have relatively low melting points, glass transition temperatures, or maximum exposure temperatures, due to the properties of the matrix material therein. In many cases, the melting point, glass transition temperature, or maximum exposure temperature of the suitable composites are as low as or lower than about 150° C. (e.g. below 100° C.). To preserve the shape and functional properties of the composite, as well as to form good adhesion and reduce thermally-induced stress between the composites and coating 126, formation of the coating 126 is preferably performed at a relatively low temperature. Preferably, the coating 126 is formed using the method 300 shown in FIG. 3. First, one or more predeposition steps may be performed on a polymer matrix fiber composite workpiece, step 302. Then, the workpiece is brought to and maintained at a temperature that is substantially equal to or below a predetermined temperature, step 304. Next, the coating 126 is formed over the workpiece, while the workpiece temperature is maintained substantially equal to or below the predetermined temperature, step 304. Each of these steps will be discussed in more detail below.

As mentioned above, the workpiece may be subjected to one or more predeposition steps, step 302. The predeposition step may be performed before or after the workpiece is placed within or proximate a deposition apparatus that will be used in subsequent steps. In one embodiment, the predeposition step may include chemically or mechanically cleaning the workpiece. During cleaning, the workpiece may be sonicated in order to dislodge and remove surface dirt or particulates. In another embodiment, the workpiece may include unwanted gases adsorbed on the surface and/or entrapped therein; thus, the workpiece may undergo a pre-deposition annealing sequence in order to evaporate the gases and to remove unstable molecules or larger moieties from the workpiece. Alternatively, the workpiece is placed in a chamber of the deposition apparatus and the unwanted gases are removed from the chamber.

Next, the workpiece is brought to a temperature that is substantially equal to or below the predetermined temperature, step 304. As mentioned above, many polymer matrix fiber composites from which the stator vane 100 may be manufactured have melting points, glass transition temperatures, or maximum exposure temperatures that are as low as or lower than about 150° C. (e.g. below 100° C.). Thus, the predetermined temperature is preferably lower than the polymer matrix fiber composite melting point, glass transition temperature, or maximum exposure temperature. It will be appreciated that the specific predetermined temperature selected depends on the particular polymer matrix fiber composite.

The workpiece may be brought to or maintained substantially equal to or below the predetermined temperature using any one of numerous techniques. In one exemplary embodiment, the workpiece is contacted with a fixture that is maintained at or below the predetermined temperature. The fixture may be made of any suitable material, such as a metallic, or a ceramic material, and may have channels formed therethrough. In either case, the fixture may be cooled by a gas (e.g. helium) or liquid (e.g. water or liquid nitrogen) that is flowed over the fixture or through the channels. Alternatively, the fixture may be cooled by a Peltier cooler.

In another embodiment, the workpiece is placed proximate a cooled substrate, where the substrate has a temperature that is below the predetermined temperature. In this case, the cooled substrate is pre-configured to receive heat radiated from the workpiece. For example, the cooled substrate may be made of a particular material, or may be shaped such that heat is more readily transferred thereto. In one example, the cooled substrate is cooled by flowing liquid (e.g. water, liquid nitrogen, or glycol) from a reservoir to the substrate. In still another embodiment, a gas, such as helium, is periodically flowed over the workpiece at a pressure greater than about 1 Torr to direct away heat emitted from the stator vane. It will further be appreciated that, in some cases, the workpiece already has a temperature measurement that is at the predetermined temperature. In these cases, the workpiece is maintained substantially equal to or below the predetermined temperature. In still yet another embodiment, the workpiece may be submerged into a liquid and heat may be removed from the workpiece by agitating or stirring the liquid, or by controlling the temperature of the liquid.

The coating 126 is formed over the workpiece, while the workpiece temperature is maintained substantially equal to or below the predetermined temperature, step 306. Any one of numerous suitable coating methods may be employed, including, but not limited to, sputtering, evaporation, low-temperature thermal and plasma-assisted chemical vapor deposition, atomic layer deposition, molecular beam epitaxy, electrochemical deposition techniques, such as electroless plating, electroplating, electrophoretic deposition, and the like. The particular coating method selected may be dependent on the particular material from which the coating 126 is to be formed, and the complexity of the shape of the workpiece. For instance, if the workpiece is relatively complex, an electrochemical deposition technique may be preferred.

Temperature maintenance may be achieved using any suitable cooling method, such as any one of the methods mentioned above. In one example, a gas, such as helium, is flowed over the workpiece at a pressure greater than about 1 Torr during the deposition process. The gas flow directs heat away from the workpiece. In some cases, it may be advantageous to periodically interrupt the deposition process in order to flow the gas over the workpiece. In an embodiment in which the workpiece is subjected to electrochemical deposition in a liquid bath, the workpiece temperature may be maintained by agitating or stirring the liquid bath or by controlling the temperature of the liquid bath.

It will be appreciated that after one layer of the coating 126 is formed, steps 304 and 306 may be repeated to form a multilayer or nanolaminate coating. Moreover, in many instances, both sides or multiple surfaces of the workpiece may need to be coated. In these cases, the workpiece may be appropriately fixtured within the deposition apparatus to suitably expose all sides of the workpiece to the coating material.

In one example, Ti/TiN coatings were formed over substrates that were made of various materials. The materials included 1) carbon-fiber epoxy-matrix composites cut from a pre-existing aircraft stator vane, 2) Poco graphite, 3) oxidized Si single crystals, 4) AM350 alloy, and 5) Ti-6-4 alloy. The substrates had varying surface finishes, morphologies, and porosities. For example, the oxidized Si Single crystal substrate had an atomically flat and dense surface, while the AM350 and Ti-6-4 alloy substrates were shot peened and had a relatively rougher surface.

Prior to deposition, each substrate was subjected to ultrasonic cleaning using isopropanol, then air dried on a hot plate having a temperature of about 100° C. Next, the substrates were loaded into a deposition chamber and alternating layers of Ti and TiN were deposited thereon. Each layer had a thickness of about 200 nm and deposition continued until the layers had a total thickness of about 3.2 microns. Deposition was performed in vacuum using reactive sputtering from a Ti target, while the substrates were mounted on a temperature-controlled platen in the deposition chamber and the temperature was maintained below 125° C.

Each resultant coating had a bluish-green appearance and was adherent and non-delaminating. The layers on the oxidized Si single crystal substrate had a measured stress of about −26 MPa and a measured resistivity of about 5,000 μΩcm. The carbon epoxy substrates were not deformed or otherwise damaged during deposition. Additionally, none of the substrates lost mass as a result of the deposition, indicating that the substrate temperatures during the deposition process were likely below 100° C. X-ray diffraction and Rutherford backscattering spectrometry indicated that targeted compositions and crystalline phases were achieved.

In another example, the same types of substrates (except the carbon-epoxy substrate) were coated using electron-beam evaporation in a high vacuum chamber, while maintained at temperatures of and below 150° C. Before deposition began, the chamber was evacuated and backfilled several times using high purity argon gas. The chamber was also thermally outgassed using infra-red lamp assemblies that resulted in temperatures between about 100° C. and 150° C. under high vacuum pumping with a liquid nitrogen filled trap disposed between a high vacuum, water-cooled diffusion pump and the chamber. Additionally, Ti was initially deposited on the chamber walls to act as a scavenger for oxidizing species and to reduce or prevent reaction of the oxidizing species with the coating materials. The resultant coatings were significantly more electrically conducting than those produced by sputtering and had a golden-brown color. X-ray diffraction and Rutherford backscattering spectrometry indicated that targeted composition and crystalline phases were achieved.

The process by which the coatings are formed is relatively inexpensive and simple to perform. Additionally, the process can be easily implemented into existing component manufacturing processes While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of forming a coating on a stator vane, the method comprising the steps of:
    placing the stator vane in a vacuum chamber, while maintaining the stator vane at a temperature substantially equal to or below a predetermined temperature, the stator vane comprising a polymer matrix fiber composite having a melting point, glass transition temperature, or maximum exposure temperature that is less than about 150° C., and the predetermined temperature being less than the melting point, glass transition temperature, or maximum exposure temperature; and
    forming a coating over the stator vane, while the stator vane temperature is maintained substantially equal to or below the predetermined temperature, the coating comprising a material that is more erosion-resistant than the polymer matrix fiber composite, wherein the material is selected from a group of constituents consisting of titanium, chromium, vanadium, and zirconium, and nitrides, carbides, mixed carbonitrides, oxides, oxynitrides, oxycarbides, and oxycarbonitrides thereof and the material has a melting point that is higher than 150° C.

2. The method of claim 1, wherein the step of maintaining comprises contacting the stator vane with a fixture having channels formed therethrough, and flowing a gas or liquid through the channels.

3. The method of claim 1, wherein the step of maintaining comprises disposing the stator vane proximate a substrate having a temperature that is substantially equal to or below the predetermined temperature, the substrate configured to receive heat radiated from the stator vane.

4. The method of claim 1, wherein the step of maintaining comprises flowing a gas over the stator vane at a pressure greater than about 1 Torr to direct heat away from the stator vane.

5. The method of claim 1, wherein the step of depositing comprises depositing the coating onto the stator vane using a sputtering process.

6. The method of claim 1, wherein the step of depositing comprises depositing the coating onto the stator vane using a chemical vapor deposition process.

7. The method of claim 1, wherein the step of depositing comprises depositing the coating onto the stator vane using a molecular beam epitaxy process.

8. The method of claim 1, wherein the step of depositing comprises depositing the coating onto the stator vane using an atomic layer deposition process.

9. The method of claim 1, wherein the step of depositing comprises depositing the coating onto the stator vane using an electron beam evaporation process.

10. The method of claim 1, wherein the step of forming a coating comprises forming a coating consisting of titanium and titanium nitride.

11. The method of claim 1, further comprising:
forming a layer over the coating, while the stator vane temperature is maintained substantially equal to or below the predetermined temperature, the layer comprising a material that is more erosion-resistant than the coating.

12. The method of claim 11, further comprising:
forming a nanolaminate by repeating the steps of forming a coating and forming a layer over the coating.

13. The method of claim 1, wherein the polymer matrix fiber composite comprises a carbon epoxy composite.

14. The method of claim 1, wherein the predetermined temperature is less than about 100° C.

15. A method of forming a coating on a stator vane, the method comprising the steps of:
placing the stator vane in a vacuum chamber, while maintaining the stator vane at a temperature substantially equal to or below a predetermined temperature, the stator vane comprising a polymer matrix fiber composite having a melting point, glass transition temperature, or maximum exposure temperature that is less than about 150° C., and the predetermined temperature being less than the melting point, glass transition temperature, or maximum exposure temperature;

forming a coating over the stator vane, while the stator vane temperature is maintained substantially equal to or below the predetermined temperature, the coating comprising a material that is more erosion-resistant than the polymer matrix fiber composite, wherein the material is selected from a group of constituents consisting of titanium, chromium, vanadium, and zirconium, and nitrides, carbides, mixed carbonitrides, oxides, oxynitrides, oxycarbides, and oxycarbonitrides thereof and the material has a melting point that is higher than 150° C.;

forming a layer over the coating, while the stator vane temperature is maintained substantially equal to or below the predetermined temperature, the layer comprising a material that is more erosion-resistant than the coating; and forming a nanolaminate by repeating the steps of forming a coating and forming a layer over the coating.

16. The method of claim 15, wherein the polymer matrix fiber composite comprises a carbon epoxy composite.

17. The method of claim 15, wherein the predetermined temperature is less than about 100° C.

18. The method of claim 15, wherein the step of forming a coating comprises forming a coating consisting of titanium and and the step of forming a layer comprises forming a layer consisting of titanium nitride.

* * * * *

UNITED STATES PATENT AND TRADEMARK OFFICE
CERTIFICATE OF CORRECTION

| | |
|---|---|
| PATENT NO. | : 7,700,167 B2 |
| APPLICATION NO. | : 11/515476 |
| DATED | : April 20, 2010 |
| INVENTOR(S) | : Ilan Golecki |

Page 1 of 1

It is certified that error appears in the above-identified patent and that said Letters Patent is hereby corrected as shown below:

Column 8, line 31, "and and" should be changed to --and--.

Signed and Sealed this

Sixth Day of July, 2010

David J. Kappos
*Director of the United States Patent and Trademark Office*